United States Patent
Maxik et al.

(10) Patent No.: US 9,137,874 B2
(45) Date of Patent: Sep. 15, 2015

(54) ILLUMINATION AND GROW LIGHT SYSTEM AND ASSOCIATED METHODS

(71) Applicant: BIOLOGICAL ILLUMINATION, LLC, Satellite Beach, FL (US)

(72) Inventors: Fredric S. Maxik, Indialantic, FL (US); Robert R. Soler, Cocoa Beach, FL (US); David E. Bartine, Cocoa, FL (US); Eliza Katar Grove, Satellite Beach, FL (US); Neil Yorio, Indian Harbour Beach, FL (US); Anthony Crawford, Palm Bay, FL (US)

(73) Assignee: BIOLOGICAL ILLUMINATION, LLC, Melbourne, FL (US)

( * ) Notice: Subject to any disclaimer, the term of this patent is extended or adjusted under 35 U.S.C. 154(b) by 0 days.

(21) Appl. No.: 13/681,522

(22) Filed: Nov. 20, 2012

(65) Prior Publication Data

US 2013/0139437 A1    Jun. 6, 2013

Related U.S. Application Data

(60) Provisional application No. 61/566,163, filed on Dec. 2, 2011.

(51) Int. Cl.
*A01G 7/00* (2006.01)
*H05B 37/02* (2006.01)
(Continued)

(52) U.S. Cl.
CPC ............. *H05B 37/02* (2013.01); *A01G 7/045* (2013.01); *H05B 33/0863* (2013.01); *H05B 33/0869* (2013.01)

(58) Field of Classification Search
CPC ........... A01G 7/045; A01G 9/00; A01G 9/14; A01G 9/20

USPC ................. 47/17, 20.1, 29.1, 58.1 R, 58.1 LS
IPC ...... A01G 9/00,13/02, 79/00, 1/00; A01B 1/00; A01C 3/00; A01H 29/00

See application file for complete search history.

(56) References Cited

U.S. PATENT DOCUMENTS

| 3,869,605 A | 3/1975 | Davis |
| 3,930,335 A | 1/1976 | Widmayer et al. |

(Continued)

FOREIGN PATENT DOCUMENTS

| DE | 202004009616 | 11/2004 |
| DE | 102010004042 A1 | 7/2011 |

(Continued)

OTHER PUBLICATIONS

Krembrink et al, "Algae Growth system", Feb. 4, 2010.*

(Continued)

*Primary Examiner* — David Parsley
*Assistant Examiner* — Thien Thanh Pham
(74) *Attorney, Agent, or Firm* — Mark Malek; William Harding; Widerman Malek, PL

(57) ABSTRACT

An illumination and grow light system and associated methods are provided to produce an emission spectrum which may be optimized for plant response curve, as well as provide high quality light with respect to the human response curve. Embodiments of the present invention may include highly efficient tunable lamps and associated modulation controls that allow specific radiation wavelength bands to be manipulated, the emission direction and intensity to be varied, and the output power to be coordinated to create high fluxes of photosynthetic active radiation while maintaining a desirable color temperature and high color rendering index.

45 Claims, 15 Drawing Sheets

(51) Int. Cl.
*A01G 7/04* (2006.01)
*H05B 33/08* (2006.01)

(56) References Cited

U.S. PATENT DOCUMENTS

| | | | |
|---|---|---|---|
| 3,931,695 A | 1/1976 | Widmayer et al. | |
| 5,012,609 A | 5/1991 | Ignatius et al. | |
| 5,036,437 A * | 7/1991 | Macks | 362/465 |
| 5,278,432 A | 1/1994 | Ignatius et al. | |
| 5,606,821 A * | 3/1997 | Sadjadi et al. | 47/1.7 |
| 5,659,977 A | 8/1997 | Jensen et al. | |
| 6,474,838 B2 | 11/2002 | Fang et al. | |
| 6,554,450 B2 * | 4/2003 | Fang et al. | 362/231 |
| 6,921,182 B2 | 7/2005 | Anderson et al. | |
| 7,058,197 B1 | 6/2006 | McGuire et al. | |
| 7,086,756 B2 | 8/2006 | Maxik et al. | |
| 7,086,767 B2 | 8/2006 | Sidwell | |
| 7,138,770 B2 | 11/2006 | Uang | |
| 2001/0018828 A1 | 9/2001 | Kadotani | |
| 2001/0047618 A1 | 12/2001 | Fang et al. | |
| 2002/0026659 A1 * | 2/2002 | Blowers et al. | 800/298 |
| 2003/0009933 A1 * | 1/2003 | Yoneda et al. | 47/1.01 R |
| 2003/0156425 A1 * | 8/2003 | Turnbull et al. | 362/545 |
| 2004/0109302 A1 | 6/2004 | Yoneda | |
| 2005/0281027 A1 | 12/2005 | Capen | |
| 2006/0022214 A1 | 2/2006 | Mueller et al. | |
| 2006/0053691 A1 | 3/2006 | Harwood et al. | |
| 2006/0104058 A1 * | 5/2006 | Chemel et al. | 362/231 |
| 2006/0176686 A1 | 8/2006 | McVicker et al. | |
| 2006/0203209 A1 * | 9/2006 | De Vaan | 353/84 |
| 2007/0058368 A1 * | 3/2007 | Partee et al. | 362/231 |
| 2007/0289207 A1 * | 12/2007 | May et al. | 47/17 |
| 2009/0086492 A1 * | 4/2009 | Meyer | 362/294 |
| 2009/0199470 A1 | 8/2009 | Capen | |
| 2010/0020536 A1 * | 1/2010 | Bafetti et al. | 362/231 |
| 2010/0076620 A1 * | 3/2010 | Loebl et al. | 700/306 |
| 2010/0115830 A1 * | 5/2010 | Dub | 47/17 |
| 2010/0259190 A1 | 10/2010 | Aikala | |
| 2010/0287830 A1 * | 11/2010 | Chen et al. | 47/58.1 LS |
| 2011/0209400 A1 | 9/2011 | Rooymans | |

FOREIGN PATENT DOCUMENTS

| | | | |
|---|---|---|---|
| EP | 1479286 A1 | 11/2004 | |
| EP | 1933602 | 12/2007 | |
| JP | 08103167 | 4/1996 | |
| JP | 08242694 | 9/1996 | |
| JP | 2000-68555 | 3/2000 | |
| JP | 3070828 | 5/2000 | |
| JP | 2000-156526 | 6/2000 | |
| JP | 2001-53336 | 2/2001 | |
| WO | WO 03-055273 | 7/2003 | |
| WO | WO 2005-089477 | 9/2005 | |
| WO | WO 2005109532 | 11/2005 | |
| WO | WO 2008002073 | 1/2008 | |
| WO | WO 2009/022016 | * 2/2009 | |
| WO | PCT/US12/67579 | 12/2012 | |

OTHER PUBLICATIONS

International Search Report and Written Opinion of PCT/US12/67579, (Dec. 3, 2012).

European Search Report EP 07114397.8, International Search Report and Written Opinion of PCT/EP2008/060776.

Stutte, et al., "Photoregulation of Bioprotectant Content of Red Leaf Lettuce with Light-emitting Diodes", HortScience, vol. 44(1), pp. 79-82, Feb. 2009.

Stutte, Gary, "Light-emitting Diodes for Manipulating the Phytochrome Apparatus", HortScience, vol. 44(2), pp. 231-234, Apr. 2009.

* cited by examiner

700 →

| Input Wattage | 65 | 45 | 65 |
|---|---|---|---|
| PAR [μmol] | 92.71 | 66.25 | 70.51 |
| YPF [μmol] | 72.05 | 49.72 | 61.20 |
| YPF/W [μmol/W] | 1.1 | 1.1 | 1.2 |
| Color Temp. (CCT) | 1,509 | 3,050 | 3,826 |
| CRI | -181 | 69 | 74 |

FIG. 7

ILLUMINATION AND GROW LIGHT SYSTEM AND ASSOCIATED METHODS

RELATED APPLICATIONS

This application claims the benefit of U.S. Provisional Patent Application No. 61/566,163 entitled "Plant Grow Light" filed Dec. 2, 2011, the entire contents of which are incorporated herein by reference. This application is related to U.S. patent application Ser. No. 12/673,522 entitled "LED Lighting Device for Growing Plants" filed Aug. 15, 2008, and to U.S. patent application Ser. No. 10/468,155 entitled "Method of Cultivating Plants" filed Jan. 9, 2004, the entire contents of each of which are incorporated herein by reference.

FIELD OF THE INVENTION

The present invention relates to systems and methods for producing light to enhance plant growth. More specifically, the invention relates to systems and methods for producing a combined light that includes wavelengths both in the plant absorption spectrum and in the human visibility spectrum.

BACKGROUND OF THE INVENTION

Promotion of plant growth using artificial light to augment or replace solar light has been the focus of significant research and experimentation. However, because each plant pigment absorbs light at one or more specific wavelengths, and the areas of peak absorption for each pigment are narrow, selecting and generating light wavelengths that produce superior plant growth remains a design challenge in grow light technology.

The absorption spectra of many plants containing chlorophyll exhibit peak absorption in the wavelength ranges of about 410-490 nanometers ("blue light") and of about 590-650 nanometers ("red light"). Comparatively little light in the wavelength range of 500-570 nanometers ("green light") is absorbed by the chlorophyll, which is consistent with the green appearance of plants. Consequently, conventional plant grow lights are designed to illuminate plants with peaks in both the blue light and red light regions corresponding generally to the plant absorption spectrum. Light in the wavelength range roughly centered on green light is often absent or near absent from the emissions of traditional grow lights. Of note is that the absorption spectra of most plants are also within the photopic spectral sensitivity for human vision, or "visible light," generally defined as light having a wavelength in the range of about 400 to 700 nanometers (nm).

Lighting technologies such as incandescent, fluorescent, metal halide, and high-pressure sodium lamps have been employed in grow lights, with varying degrees of success. However, these conventional light sources suffer from various degrees of poor electrical efficiency (ranging from 10% to 40% of electrical energy consumed being converted to optical energy emitted within the visible spectral region) and low operation lifetimes (ranging from 1,000 hours to 24,000 hours of performance). Furthermore, these conventional light sources cannot control the spectral quality of emissions without the inefficient and limited utilization of additional filters. Moreover, these technologies' control of the radiation quantity is also limited, reducing the possibility of versatile lighting regimes such as pulsed operation. Also, the red-blue light of conventional plant grow lights is unattractive to humans as it appears purple and does not reveal the true or near true color of the plants that it illuminates.

Use of light-emitting diodes (LEDs) and related solid-state lighting (SSL) as potentially viable alternative lighting technologies for grow lights is gaining attention in the art. The best AlInGaP red and AlInGaN green and blue HB-LEDs can have internal quantum efficiencies better than 50%. Moreover, LED-based light sources support full controllability of both the direction and intensity of the emitted radiation, making it possible to avoid most of the losses associated with traditional grow lights. Additionally, the narrow spectral bandwidth characteristic of colored LEDs allows selection of the peak wavelength emission that most closely matches the absorption peak of a selected plant pigment. Furthermore, because LED lighting is much cooler than conventional plant lighting sources, an LED-based plant light may be placed much closer to a plant than a conventional plant light, with a resulting increase in light intensity falling on the leaves of a plant.

U.S. Pat. Nos. 5,278,432 and 5,012,609, both issued to Ignatius et al., disclose using an array of LEDs to provide radiant energy to plants broadly within bands 620 to 680 nm or 700 to 760 nm (red), and also 400 to 500 nm (blue). U.S. Pat. No. 6,921,182 to Anderson et al. discloses a proportion of twelve red LEDs (660 nm), plus six orange LEDs (612 nm) and one blue LED (470 nm). U.S. Patent Publication No. 2010/0259190 by Aikala discloses a single light emission source LED device capable of generating emission peaks that match well with a plant photosynthesis response spectrum. All of the implementations above attempt to provide an optimal mix of wavelengths to enhance plant growth, as well as low power consumption and long operation lifetime when compared to the existing grow light technologies. However, none of these implementations automatically adjust their emission spectra to match the specific energy absorption demands of different plants nor the evolving absorption demands of over time of a single plant. Furthermore, none of these implementations address the fact that the mix of wavelengths chosen to enhance plant growth are also unattractive to humans viewing the illuminated plant.

U.S. Patent Publication No. 2009/0199470 by Capen et al. discloses a lamp for growing plants that includes a set of red LEDs with a peak wavelength emission of about 660 nm, a set of orange LEDs with a peak wavelength emission of about 612 nm, and a set of blue LEDs with a peak wavelength emission of about 465 nm. The lamp also includes a green LED that has a wavelength emission between 500 and 600 nm, the purpose of which is to provide a human observer with an indication of general plant health. However, the disclosed implementation suffers from similar deficiencies as the references discussed above as it does not automatically adjust its emission spectra to match the specific energy absorption demands of different plants nor the evolving absorption demands of over time of a single plant. Furthermore, the course addition of green light to its mix of wavelengths falls short of revealing the true or near true color of the plants that it illuminates This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the foregoing in mind, embodiments of the present invention are related to systems and methods for producing light which is optimized for plant growth, spectral sensitivity, and energy efficiency. In one embodiment, red light generated by the luminaire according to an embodiment of the present invention may advantageously stimulate photosynthesis, overlapping well with the plant response curve while not overlapping the human photopic response curve. In yet another embodiment, the luminaire according to an embodiment of the present invention may advantageously produce a spectrum of light optimized for plants requiring significant amounts of blue light. In another embodiment, the luminaire may advantageously produce a spectrum of light optimized for plants that do not require as much blue light. In yet another embodiment, the luminaire may advantageously employ highly efficient tunable lamps that may allow color temperature and color rendering index (CRI) to be varied, the intensities of specific radiation wavelength bands to be controlled, and the output power to be coordinated to create high fluxes of photosynthetic active radiation while maintaining a desirable color temperature and high CRI.

These and other objects, features and advantages according to embodiments of the present invention are advantageously provided by an illumination and grow light system that may feature selectable emission characteristics. The lighting system according to an embodiment of the present invention may comprise a controller and a plurality of light sources that may be operatively coupled to the controller. Each of the plurality of light sources may be individually operable to emit a combined light. The controller may control the emission characteristics of the light sources to alter the combined light.

More particularly, the combined light may have a color temperature greater than about 3000 Kelvin, may have a color rendering index (CRI) of greater than about 65, and may have a photosynthetic efficiency of greater than about 1 micromole yield photon flux per watt. The combined light may comprise a first light having a wavelength within the range of about 650 nanometers to about 700 nanometers, a second light having a wavelength within the range of about 500 nanometers to about 570 nanometers, and a third light having a wavelength within the range of about 430 nanometers to about 470 nanometers.

The combined light may have a color temperature of greater than about 3800 Kelvin and a Color Rendering Index of greater than about 70. The controller may be configured to modulate the emissions of the plurality of light sources in a pulsed fashion. Further, the controller may be configured to modulate the emissions of the plurality of light sources using of pulse-width modulation, pulse-interval modulation, and/or pulse-amplitude modulation. The controller may further be configured to modulate the emissions of the plurality of light sources in a pulsed pattern that minimizes light saturation in flora upon which the combined light emitted by the plurality of light sources is incident.

The plurality of light sources may include a first light source configured to emit light in a first wavelength range and a second light source configured to emit light in a second wavelength range. The controller may be configured to modulate the emissions of the first light source in a first pulsed pattern, and configured to modulate the emissions of the second light source in a second pulsed pattern. The lighting system according to an embodiment of the present invention may also include a sensor having a field of view. The sensor may be operatively coupled to the controller and may be configured to measure light saturation in flora within the field of view of the sensor. The controller may receive an indication of light saturation in flora from the sensor and may be configured to control emission characteristics for the plurality of light sources responsive to the indication of light saturation in flora from the sensor.

The sensor may be a fluorometer, and the indication of light saturation may include a measurement of a fluorescence being emitted from the flora. In another embodiment of the lighting system according to the present invention, the sensor may be a spectrometer, and the indication of light saturation may include a measurement of a wavelength of light being reflected from the flora. The indication of light saturation may include the measurement of the wavelength of light being emitted from the flora that is within a range of one of 650 nanometers to about 700 nanometers, about 500 nanometers to about 570 nanometers, and/or about 430 nanometers to about 470 nanometers. In still another embodiment of the lighting system of the present invention, the sensor may be an infrared sensor. In this embodiment, the indication of light saturation in the flora may comprise a measurement of an infrared radiation being emitted from the flora.

The lighting system according to an embodiment of the present invention may also include a housing. The housing may be configured to be adjustable to allow for directional control and/or intensity control of the combined light emitted by the plurality of light sources. In some embodiments of the lighting system according to the present invention, the controller may be configured to receive an indication of light saturation in the flora from the sensor and to adjust the housing to distribute the combined light in a direction and at an intensity that optimizes light saturation in the flora upon which the combined light emitted by the plurality of light sources is incident.

The lighting system according to an embodiment of the present invention may emit a combined light that has a photosynthetic efficiency of greater than about 1.2 micromoles Yield Photon Flux per Watt. The plurality of light sources may be provided by light-emitting diodes. In other embodiments, the light sources may be provided by one or more lasers. In some embodiments, the plurality of light sources may include a hyper-red light-emitting diode, an amber light-emitting diode, and/or a blue-white light-emitting diode.

The plurality of light sources may have a ratio of hyper-red light-emitting diodes to amber light-emitting diodes to blue-white light-emitting diodes of about 6:1:5. In other embodiments of the lighting system according to the present invention, the plurality of light sources may also include any combination of hyper-red light-emitting diodes and/or mint light-emitting diodes. In such an embodiment, the plurality of light sources may have a ratio of hyper-red light-emitting diodes to mint light-emitting diodes of about 2:1.

An embodiment of the lighting system according to the present invention may further include one or more optics. Each optic may be paired with and disposed adjacent to the light-emitting diode such that light emitted from the light-emitting diode is incident upon the each of the one or more optics. The optics may include a diffusive coating, a diffusive plastic, diffusive particles, and a color filter. The lighting system according to an embodiment of the present invention may also include a power supply operably coupled to the controller. The controller may be configured to regulate current from the power supply to control emission characteristics for the plurality of light sources to emit the combined light. A method aspect of the present invention is for illuminating flora comprising directing a spectrum of optical radiation on flora. The spectrum of radiation may have a color temperature of greater than about 2700 Kelvin, a color rendering index of greater than about 60, and a photosynthetic efficiency of greater than about 1 micromole yield photon flux per watt.

BRIEF DESCRIPTION OF THE DRAWINGS

FIG. 7 is a table illustrating a comparison of emission parameters of the exemplary grow light of FIG. 2, the invention embodiment of FIG. 5, and the invention embodiment of FIG. 6.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Additionally, the term "horticultural growth" is known in the art and may relate herein to any plant, crop, bush, tree, including for example vegetation that bears or is a fruit, a vegetable, a mushroom, a berry, a nut, a flower, a tree, a shrub, or a turf. Horticultural growth herein especially relates to indoor horticultural growths, such as especially any plant, crop, bush, tree, grown for human or animal consumption or other human use, such as indoor or outdoor decoration. Also, a person skilled in the art should notice this description may contain other terminology to convey position, orientation, and direction without departing from the principles of the present invention.

Grow Light Problem Space

Figure 1:
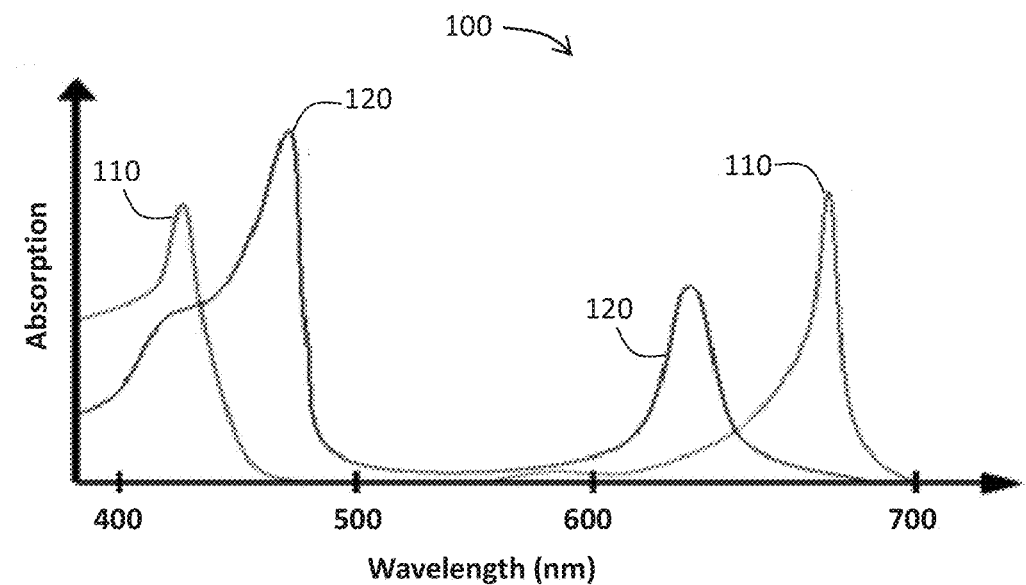
FIG. 1 is a graph illustrating an absorption spectrum of an exemplary plant containing chlorophyll.

Photosynthesis is a process by which chlorophyll molecules in plants absorb light energy and use that energy to synthesize carbohydrates from carbon dioxide ($CO_2$) and water. Referring now to FIG. 1, the absorption spectrum 100 of a green plant is illustrated for the two main types of chlorophyll, named chlorophyll a and chlorophyll b. The slight difference in the composition of a sidechain in the two types of chlorophyll causes the absorption spectrum of chlorophyll a 110 to differ from the absorption spectrum of chlorophyll b 120. Consequently, the two kinds of chlorophyll complement each other in absorbing light energy, such that light of a wavelength that is not significantly absorbed by chlorophyll a may instead be captured by chlorophyll b, which may absorb strongly at that wavelength.

Continuing to refer to FIG. 1, the absorption maxima of chlorophyll a are at 430 nm and at 662 nm. The absorption maxima of chlorophyll b are at 453 nm and 642 nm. Little or no absorption of "green light" with wavelengths in the 500 to 600 nm range is present in the absorption spectra of either chlorophyll a or chlorophyll b 110, 120.

Figure 2:
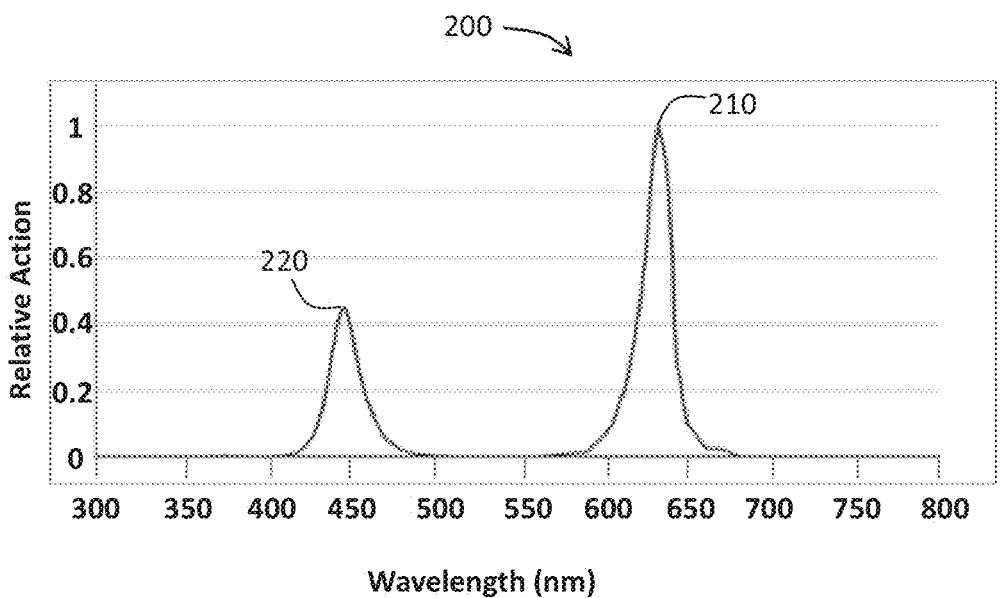
FIG. 2 is a graph illustrating an emissions spectrum of an exemplary grow light known in the art.

Referring now to FIG. 2, the emissions spectrum of a traditional grow light 200 features peaks in both the red light 210 and blue light 220 regions. As illustrated, the red light peak 210 is about 625 nm and the blue light peak 220 is about 450 nm. Such a configuration attempts to coarsely match the absorption spectrum of plants containing chlorophyll 100.

Figure 3:
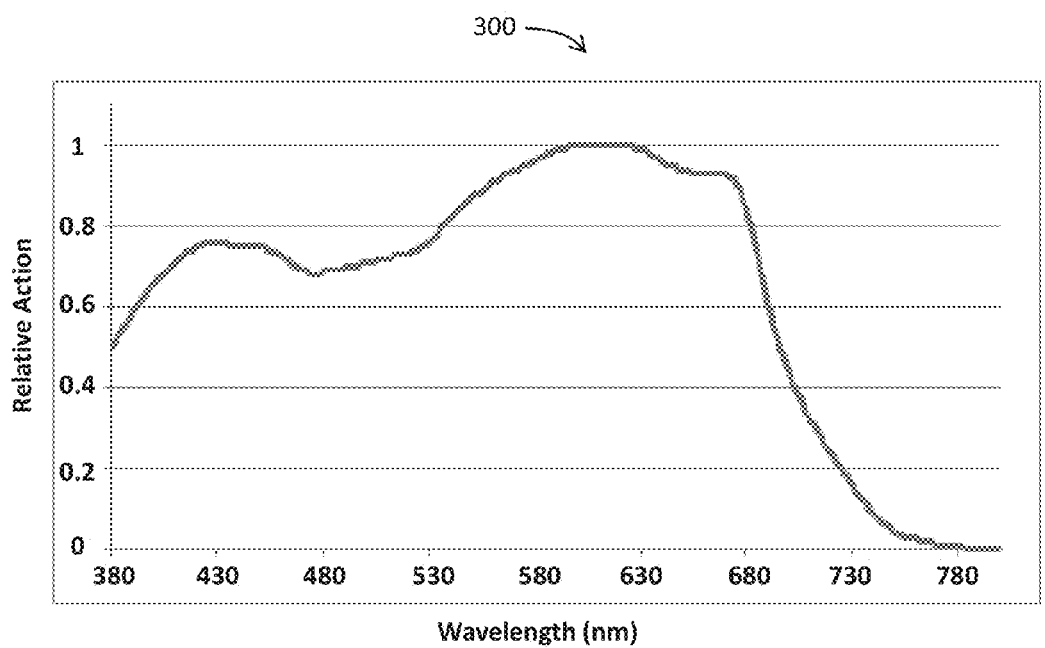
FIG. 3 is a graph illustrating a normalized photosynthetic response action spectrum for the exemplary plant of FIG. 1.

Referring now to FIG. 3, an action spectrum 300 is a plot of biological effectiveness as a function of the wavelength of incident light. The abscissa is wavelength in nanometers (nm) and the ordinate is the relative action normalized to 1. As indicated from the action spectrum 300, plants respond to the broad range of optical light but are most responsive in the 580 to 680 nm range (generally red light). Additionally, many varieties of plant species require a significant amount of light energy with a wavelength less than 500 nm (generally blue light) for healthy or optimum growth.

Figure 4:
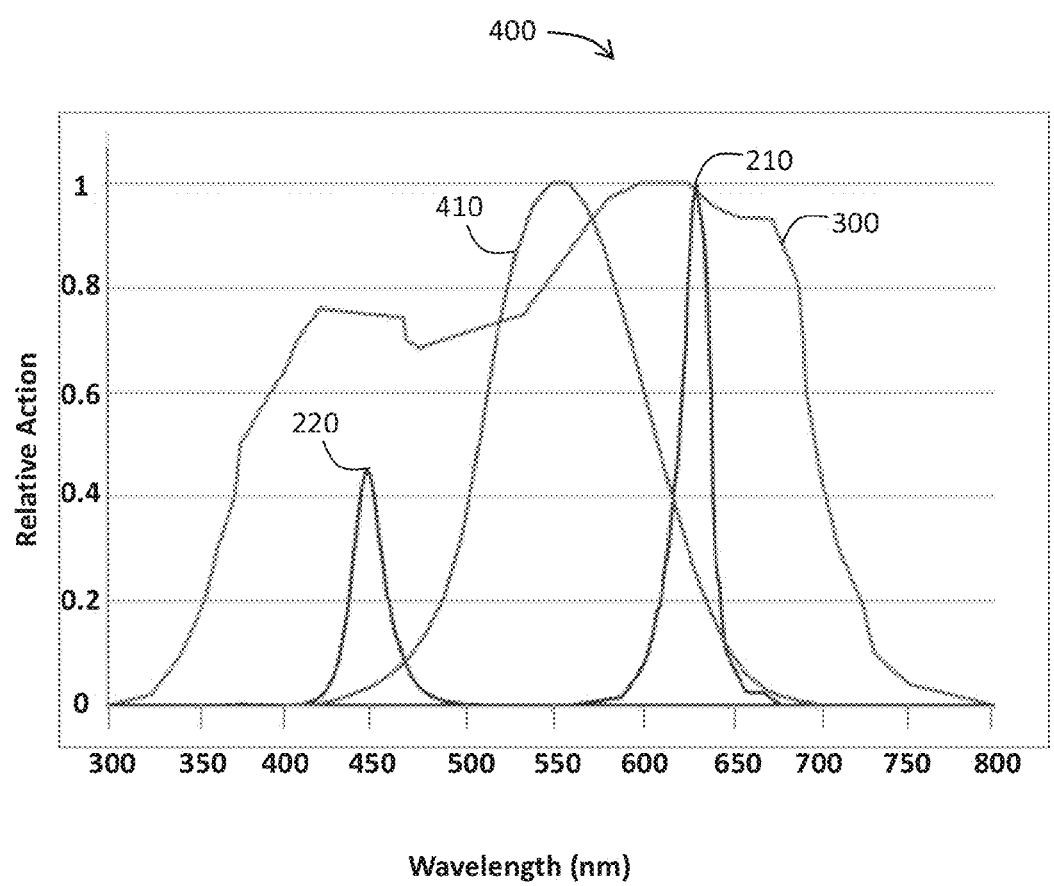
FIG. 4 is a graph illustrating a human photopic response spectrum overlayed with the exemplary photosynthetic response action spectrum of FIG. 3 and with the exemplary grow light emissions spectrum of FIG. 2.

Referring now to FIG. 4, the graph illustrates an overlay of the emissions spectrum of a conventional grow light 200, the normalized plant photosynthetic response action spectrum 300, and the human photopic response 410. The human photopic response is essentially the action spectrum of the human visual system. Per the illustration, conventional grow lights that employ simple configurations of blue and red lights do not provide light energy optimized to the absorption capability of plants 300. Furthermore, because of the absence or near absence of light in the 500 to 560 nm range (green light), the color of light generated by traditional grow light solutions 210, 220 has a purple hue, which is unpleasant to humans as it does not reveal the true color or near true color of the plant that it illuminates.

Present Invention Light Characteristics

Embodiments of the present invention may provide both increased efficiency in supplying plants with energy while providing attractive (color temperature) and realistic (color rendering) appearance to humans. The figures and accompanying description below shows overlays of the new grow light spectrum with the plant action spectrum and the human photopic response according to two example embodiments of the invention. Neither of the example embodiments nor specific features of their implementations should be considered limiting to the scope of the invention.

The following parameters are relevant to photosynthetic efficiency in grow light technology:

Photosynthetically Activated Radiation (PAR)—radiation between 400 and 700 nm (how much light energy is available to plants)

Photosynthetic Photon Flux (PPF)—number of photons per second onto one square meter Yield Photon Flux (YPF)—weighted measure of photons per second (how effectively the PPF is used by plants); Note: Because red light (or red photons) is used by a grow light more effectively to induce photosynthetic reaction, YPF PAR gives more weight to red photons based on the plant sensitivity curve.

Figure 5:
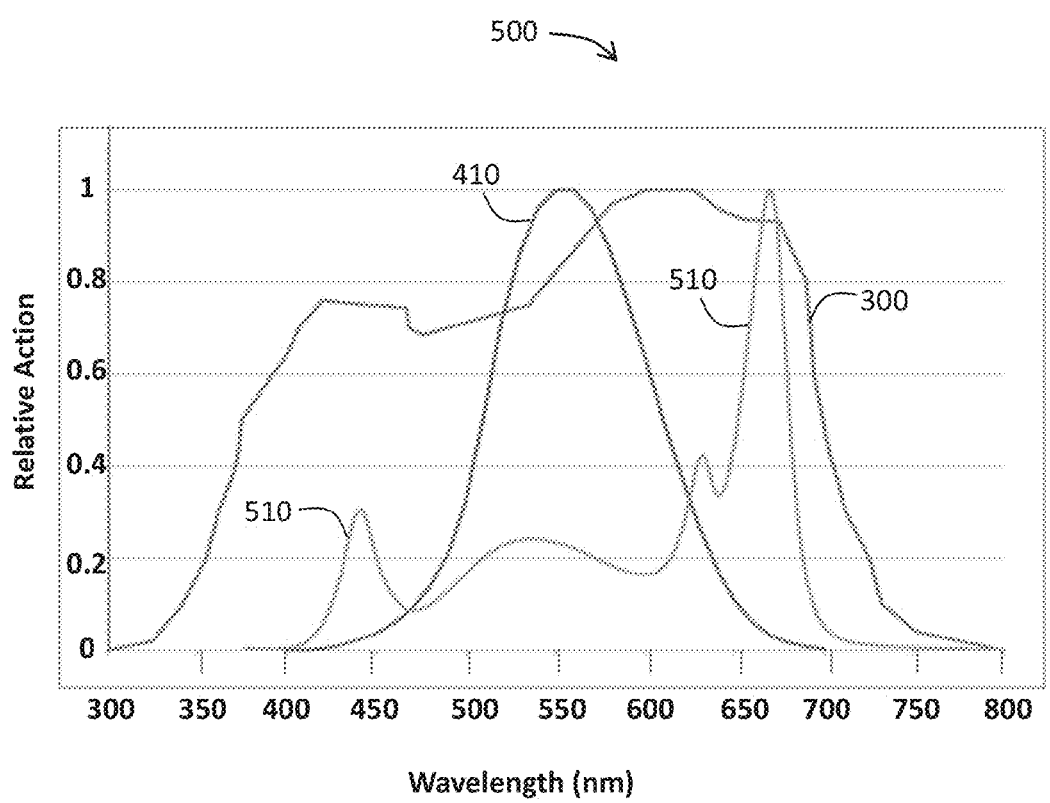
FIG. 5 is a graph illustrating an emissions spectrum of an illumination and grow light system according to one embodiment of the present invention.

Referring now to FIG. 5, one embodiment of the present invention targeted to plants that need a significant amount of blue light is discussed in more detail. For example, and without limitation, a light source may be configured to emit a spectrum 510 as shown. This embodiment may be designed to produce an emission spectrum which not only may match well with the plant response curve 300, but also may provide high quality light with respect to the human (photopic) response curve 410.

More specifically, as illustrated in the emitted spectrum 510, the intense peak in the far red (650 to 700 nm range) may overlap well with the plant response curve 300 while at the same time not overlapping with the human photopic response curve as significantly as do the emissions of conventional grow lights (see FIG. 4). The generated emission spectrum 510 may have a sufficient amount of visible light roughly in the green light region to provide light with good color rendering properties and an attractive appearance to humans (specifically, plants appear green, which is their true color under this light). The red light present in the generated light 510 may be very effective at stimulating plant response and may also be energy efficient. The spectrum 510 also may include blue light to ensure that plants may receive adequate blue light necessary for growth.

Figure 6:
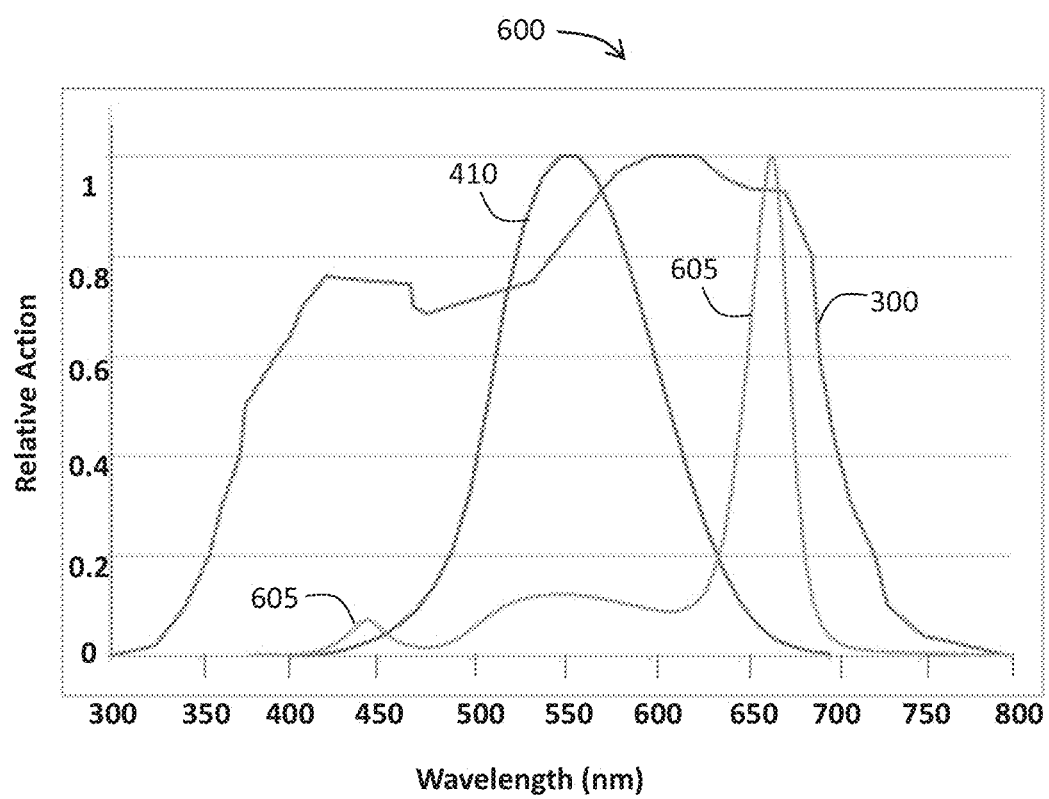
FIG. 6 is a graph illustrating an emissions spectrum of an illumination and grow light system according to one embodiment of the present invention.

Referring now to FIG. 6, another embodiment of the present invention targeted to plants that do not require as much blue light is discussed in more detail. For example, and without limitation, a light source may be configured to generate an emitted spectrum 605 as shown. This embodiment may be designed to produce an emission spectrum 605 that features significantly less blue light, which may be more advantageous for some species of plants (for example, algae). The emission spectrum 605 may not only match well with the plant response curve 300, but also may provide high quality light with respect to the human (photopic) response curve 410. More specifically, the presence of green light enhances the color rendering properties of the generated light 605, which may produce attractive light quality for humans (shows plants in a realistic manner). Additionally, the far red light used in this embodiment may be less susceptible to thermal variations and attenuation.

More specifically, as illustrated in the emitted spectrum 605, the red peak may overlap the plant photo action spectrum 300 (very effective light for plant growth), but may not significantly overlap the photopic response 410 causing a reddish appearance. The generated emission spectrum 605 may have a sufficient amount of green light to yield a desired color temperature and good CRI.

Both embodiments 500, 600 may yield good color rendering and good color temperatures, making them acceptable and attractive to humans. Referring now to the table 700 at FIG. 7, the relevant parameters are compared for a conventional grow light 710, for the embodiment featuring less blue light 720, and for the embodiment featuring more blue light 730. The two example embodiments of the present invention have good color temperatures and comparatively high CRIs (good for human vision) compared to the conventional lamp, while providing the highest yield of photon flux per watt (YPF/W), which is a measure of how efficiently the lamp can convert energy into plant-usable photons. More specifically, in both examples the YPF exceeds that of the conventional grow light. Moreover, the color temperature of both embodiments is above 3000 Kelvin while the conventional grow light is near 1500 Kelvin, and the CRI of both embodiments is greater than 65 while the conventional grow light CRI is negative. This result demonstrates that the grow light designs of the present invention may be superior to the conventional grow light in at least the following areas of performance: 1) uses less energy, 2) produces more Yield Photon Flux (YPF), and 3) yields a much higher CRI and attractive color temperature.

The embodiments described above are for example, and without limitation. Other spectra and optical designs could be used to accomplish one aspect of an embodiment of the invention, namely providing efficient and highly effective light for plant growth while providing a light of good visual quality and comparatively high color rendering indices (CRI). Specifically, other spectral intensity distributions can be generated along with corresponding desired color temperatures and/or color rendering indices according to the application at hand.

Present Invention Configuration

Figure 8:
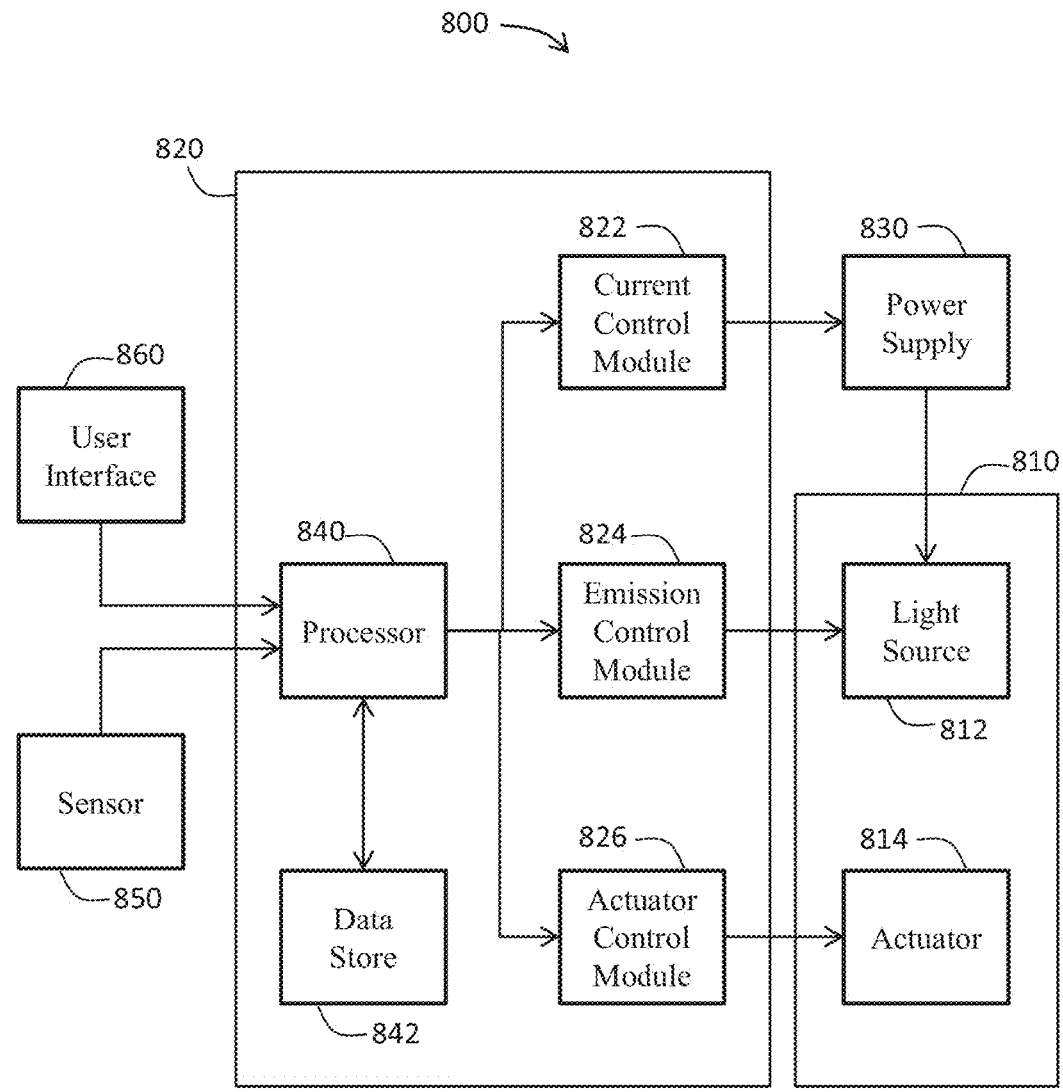
FIG. 8 is a block diagram illustrating an illumination and grow light system according to an embodiment of the present invention.

Referring now to FIG. 8, the logical components 800 of an illumination and grow light system according to an embodiment of the present invention will now be described in greater detail. For example, and without limitation, the logical components 800 of a system according to an embodiment of the present invention may comprise a lighting unit 810, a controller 820, a power supply 830, a sensor 850, and user interface 860 that may be arranged to produce a combined light that may exhibit a desired emission spectrum. The controller 820 may be designed to control the characteristics of the light emitted by the lighting unit 810. The power supply 830 may provide electric current to the lighting unit 810. The lighting unit 810 may comprise a light source 812 arranged to generate light, and also may include some number of actuators 814 designed to manipulate some characteristic of the generated light. For example, and without limitation, the actuators 814 may be electrical, mechanical or otherwise, and may operate to alter the direction and/or intensity of the generated light.

Continuing to refer to FIG. 8, the controller 820 may comprise a current control module 822 that may control the electric current provided to the lighting unit 810 by the power supply 830. The controller 820 may also comprise an emission control module 824 that may control the emission characteristics of light generated by individual light sources 812. The controller 820 may also comprise an actuator control module 826 that may control the physical manipulation of individual light sources 812 and/or of the entire lighting unit 810 by available actuators 814 in some embodiments. The current control, emission control, and actuator control modules 822, 824, 826 may be implemented as program instructions executed by a processor 840 as recorded in a data store 842.

The controller 820 may be configured to process input from some number of sensors 850, and to signal or otherwise control to obtain a desired spectral output from the lighting unit 810. A sensor 850 may be configured to sense (or monitor) ambient conditions incident to a horticultural growth and to transmit information to the controller 820. For example, and without limitation, a sensor 850 may be a simple timer or, alternatively, an environment sensor such as a fluorometer, a spectrometer, or infrared sensor. The controller 820 may respond to the signal from a sensor 850 by using one or more of the current control, emission control, and/or actuator control modules 822, 824, 826 to direct the tuning of the emission properties the lighting unit 810 such as light spectrum, shape, and flux. For example, and without limitation, the controller 820 may comprise a library of predefined types of horticultural growth. From a signal transmitted by the sensor 850, the controller 820 may derive the type of horticultural growth and the controller 820 then may choose, based on predetermined relations programmed as instructions saved in the data store 842 of the controller 820, an emission spectrum and may provide the corresponding control signal to the lighting unit 810. Hence, the present invention may allow tailoring of the emission spectrum to the type of horticultural growth.

Continuing to refer to FIG. 8, the present invention may include a user interface 860 that may be in communication with the processor 840 to transmit signals to the controller 820. The controller 820 may respond to the signals received from a user interface 860 by using one or more of the current control, emission control, and/or actuator control modules 822, 824, 826 to direct the tuning of the emission properties the lighting unit 810 such as light spectrum, shape, and flux as described above. For example, and without limitation, the tuning of the lamp using a user interface 860 may be manual (e.g., conventional dials and switches) or automated.

The controller 820 may, for example, employ one or more of the current control, emission control, and/or actuator control modules 822, 824, 826 to control the emissions of the lighting unit 810 in a way that may optimize the emission spectrum for the subject plant and may substantially minimize wasted lighting. Furthermore, the controller 820 may be configured to respond to input signals from sensors 850 and/or user interfaces 860 to control the spectrum, shape, and flux of light emitted from the lighting unit 810 to satisfy varying light demands of a single plant with respect to time and/or metabolic processes. Spectral tuning may be done automatically based on a time, a computer algorithm, or based on real or near real-time feedback from the environment and/or the plant. For example, and without limitation, a programmable timer circuit 850 may be included and the time synchronized to the environment (e.g., time of day, time of year, light cycle, etc.), and/or the photoperiod of a plant or other desired time frame. Timing may vary across species (e.g., growth cycle, growth stage, etc.).

Figure 9:
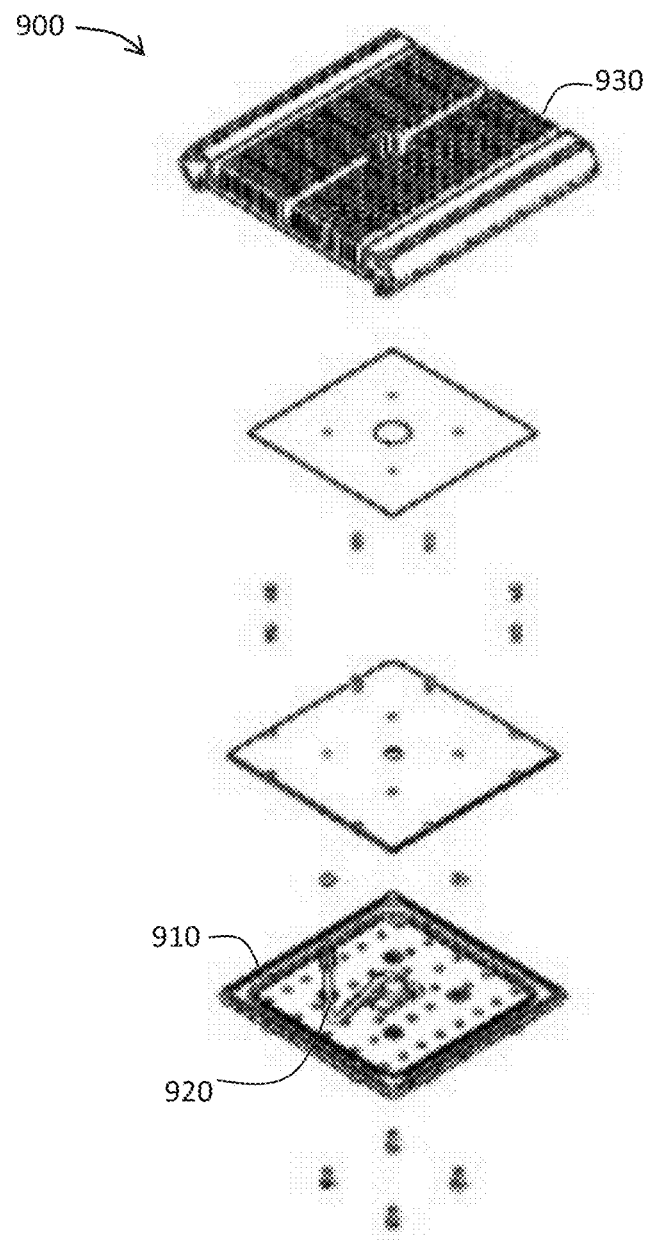
FIG. 9 is an exploded perspective view of a lamp used in connection with an illumination and grow light system according to an embodiment of the present invention.
Figure 10:
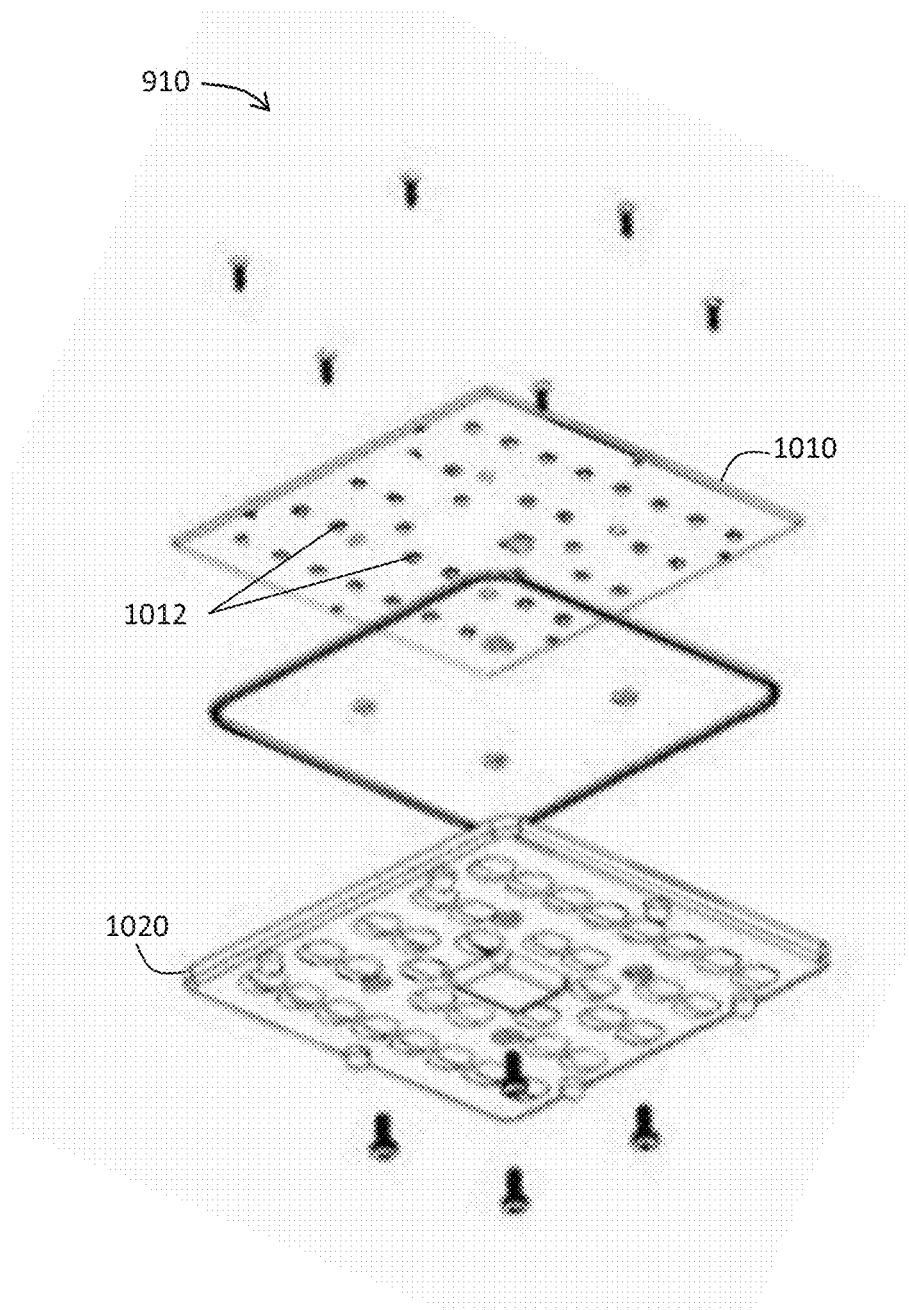
FIG. 10 is an exploded perspective of a light source of the lamp illustrated in FIG. 9.

Referring now to FIGS. 9 and 10, the physical components of a LED lamp 900 designed to operate in accordance with some embodiments presented herein will be discussed in greater detail. For example, and without limitation, the LED lamp 900 may employ a light emitting diode (LED) package 910. The LED package 910 may comprise a circuit board 1010 with LED chips 1012 that may be adhered thereto and may be configured to interface 920 with a power supply to power the circuit board 1010 and to drive the LEDs 1012.

As known in the art, the durability of an LED chip may be affected by temperature. Continuing to refer to FIG. 9, a heat sink 930 and structures equivalent thereto may serve as means for dissipating heat from the LEDs within a LED lamp 900. In one embodiment, a heat sink 930 may include fins to increase the surface area of the heat sink. Alternatively, heat sink 930 may be formed of any configuration, size, or shape, with the general intention of drawing heat away from the LEDs within the LED package 910. A heat sink 930 may be formed of a thermally conductive material such as aluminum, copper, or steel, but may be of any material that effects heat transfer. Moreover, other embodiments of heat sinks 930, including active sinks, are contemplated by the invention.

Continuing to refer to FIG. 10, an optic 1020 may be provided to surround the LED chips 1012 within the LED package 910. As used herein, the terms "surround" or "surrounding" may mean partially or fully encapsulating. For example, and without limitation, an optic 1020 may surround the LED chips 1012 by partially or fully covering one or more LEDs 1012 such that light produced by one or more LEDs 1012 may be transmitted through the optic 1020. Optic 1020 may be formed of alternative forms, shapes, or sizes. In one embodiment, optic 1020 may serve as an optic diffusing element by incorporating diffusing technology, such as described in U.S. Pat. No. 7,319,293 (which is incorporated herein by reference in its entirety). In such an embodiment, optic 1020 and structures equivalent thereto serve as a means for defusing light from the LED chips 1012. In alternative embodiments, optic 1020 may be formed of a light diffusive plastic, may include a light diffusive coating, or may having diffusive particles attached or embedded therein.

In one embodiment, optic 1020 includes a color filter applied thereto. The color filter may be on the interior or exterior surface of optic. The color filter is used to modify the light output from one or more of the LED chips 1012, and may be in one embodiment formed of a deep-dyed polyester film on a polyethylene terephthalate (PET) substrate.

Continuing to refer to FIG. 10, a printed circuit board (PCB) 1010 may include dedicated circuitry, such as power supply, drive circuit, and controller. The circuitry on the PCB 1010 and equivalents thereof serve as a means for driving the LED chips 1012 (or individual LED dies) to produce the grow light output. As used herein, the term "LED chip(s)" is meant to broadly include LED die(s), with or without packaging and reflectors, that may or may not be treated (for example, and without limitation, with applied phosphors).

A power supply may be used to provide power to a drive circuit which may provide electrical current to the LEDs 1012. A power supply may, for example, convert AC power to DC power for driving the LEDs 1012. A drive circuit may receive power input from power supply, and in turn, the drive circuit may provide an appropriate current supply to drive the LEDs 1012 in accordance with the desired spectral output. In some embodiments, a controller or other tuning mechanism may serve to control the driving of LEDs 1012, and may control light output based on factors such as plant metabolism metrics, time of day, ambient light, real time input, temperature, optical output, and location of the lamp.

Figure 11:
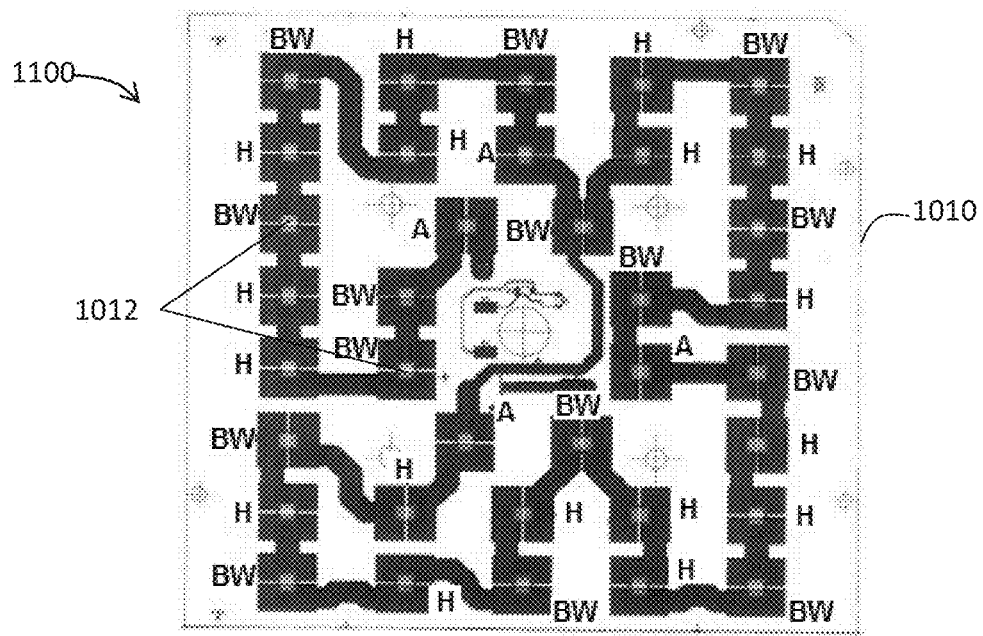
FIG. 11 is a top view of a light source circuit board for a light source of an illumination and grow light system according to an embodiment of the present invention.
Figure 12:
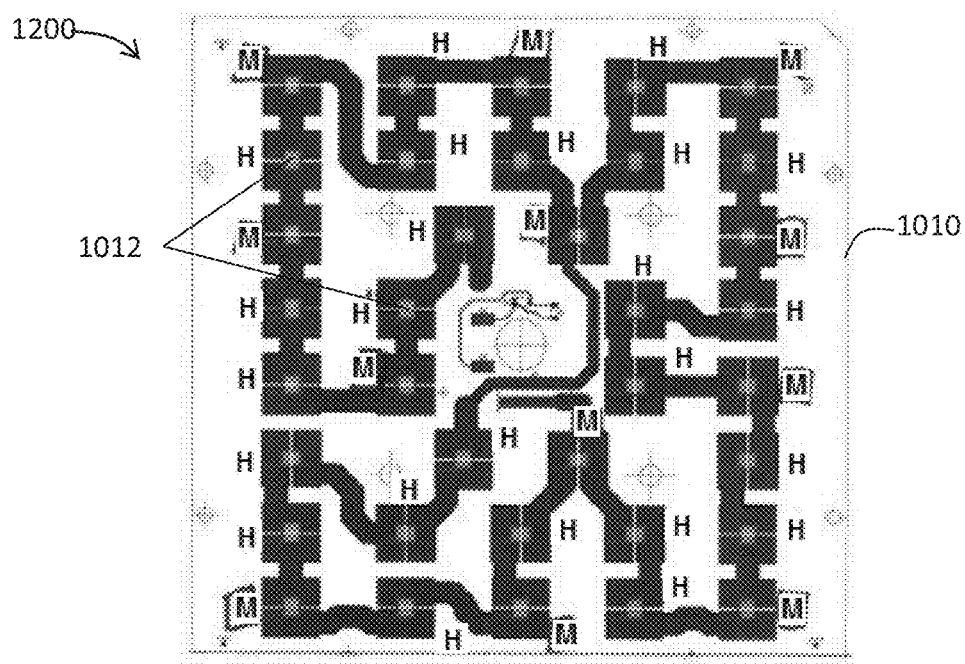
FIG. 12 is a top view of another embodiment of a light source circuit board for a light source of an illumination and grow light system according to an embodiment of the present invention.
Figure 13:
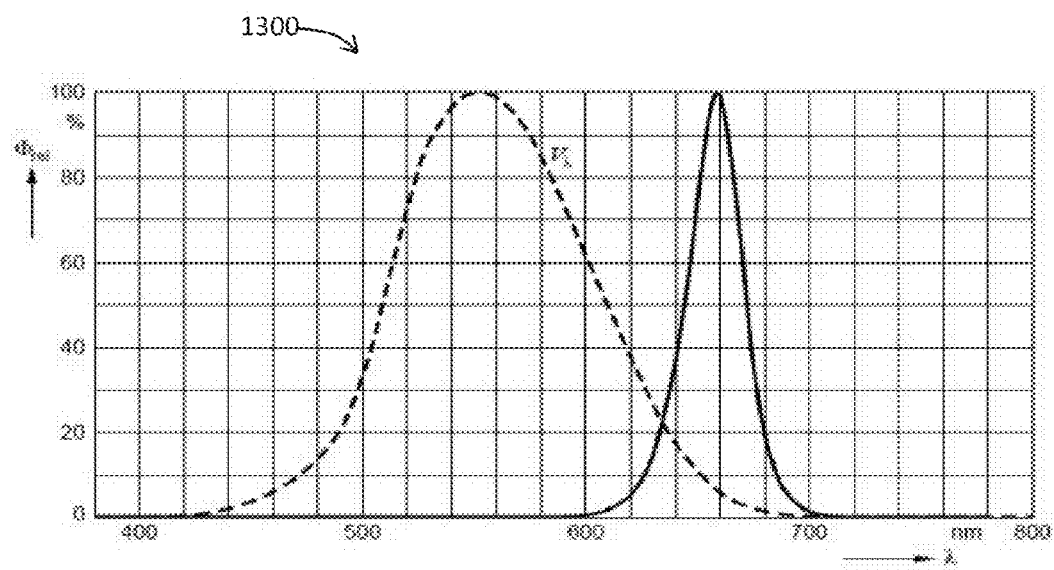
FIG. 13 is a graph of the light emitting spectrum of a Hyper-Red (LH-CPDP) light emitting diode (LED).

Referring now to FIGS. 11 and 12, LED chips 1012 may be mounted onto a circuit board 1010. Although a specific number, type and configuration of LED die or packages are shown, alternative embodiments may include other numbers and combination of LED chips 1012. More specifically, another embodiment may generate greater or lesser amounts of far red, near red, green, blue, and other colors (using the blue-white die) to yield the desired spectrum. To obtain a desired output in terms of color temperatures and/or CRI and/or optimization of PAR, an LED package may employ a specific combination of different color LEDs, and each LED or groups of LEDs may be independently addressed and driven at different currents in order to generate a desired output of light from each specific LED or groups of LEDs. LEDs may be laid out on a board in similar fashion to the examples 1100, 1200 shown in FIGS. 11 and 12 (or differently), but because each LED (or groups of LEDs) may be supplied with power independent of (or at least varying with respect to) the other LEDs or groups, the ability to tune the output to desired emissions characteristics may be achieved.

The schematic board layouts of an LED package 1100, 1200 in accordance with embodiments of the invention, depict functional components which may be mounted on a PCB 1010, or otherwise associated with an LED lamp 900.

Referring now to FIG. 11, an illustration of an LED die layout on the circuit board according to one embodiment of the present invention is provided for example, and without limitation. The example layout in FIG. 11 corresponds to the generated spectrum described above in relation to FIG. 5. In this example, a total of 36 LED chips may be used and placed on the circuit board, the combination of LEDs including 15 "Bluish-white" LEDs, 4 Amber, and 17 Hyper-Red LEDs. The color temperature of the combined light emitted by an LED lamp featuring this PCD layout 1100 may be about 3800 Kelvin and the CRI may be about 74.

Referring now to FIG. 12, an illustration of an LED die layout on the circuit board according to another embodiment of the present invention is provided for example, and without limitation. The example layout in FIG. 12 corresponds to the generated spectrum described above in relation to FIG. 6. In this example, a total of 36 LED chips may be used and placed on the circuit board, the combination of LEDs including 12 "mint" LEDs, and 24 Hyper-Red LEDs. The color temperature of the combined light emitted by an LED lamp featuring this PCD layout 1200 may be about 3000 Kelvin and the CRI may be about 69.

Figure 14:
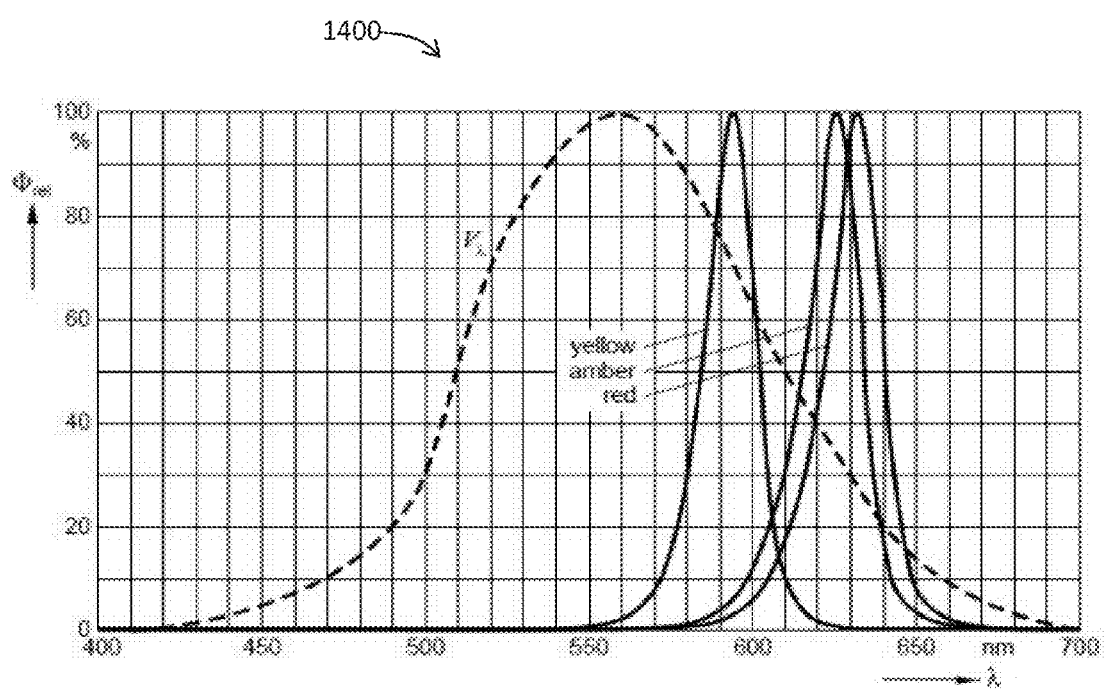
FIG. 14 is a graph of the light emitting spectrum of an Amber (KXKZ-23-Z) light emitting diode (LED).
Figure 15:
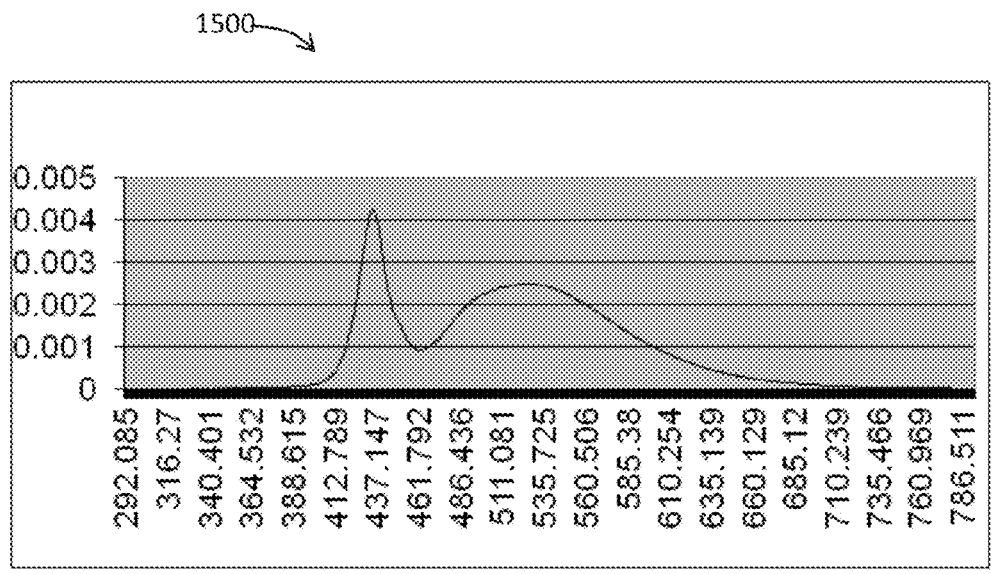
FIG. 15 is a graph of the light emitting spectrum of a Bluish-White (M57301_01) light emitting diode (LED).
Figure 16:
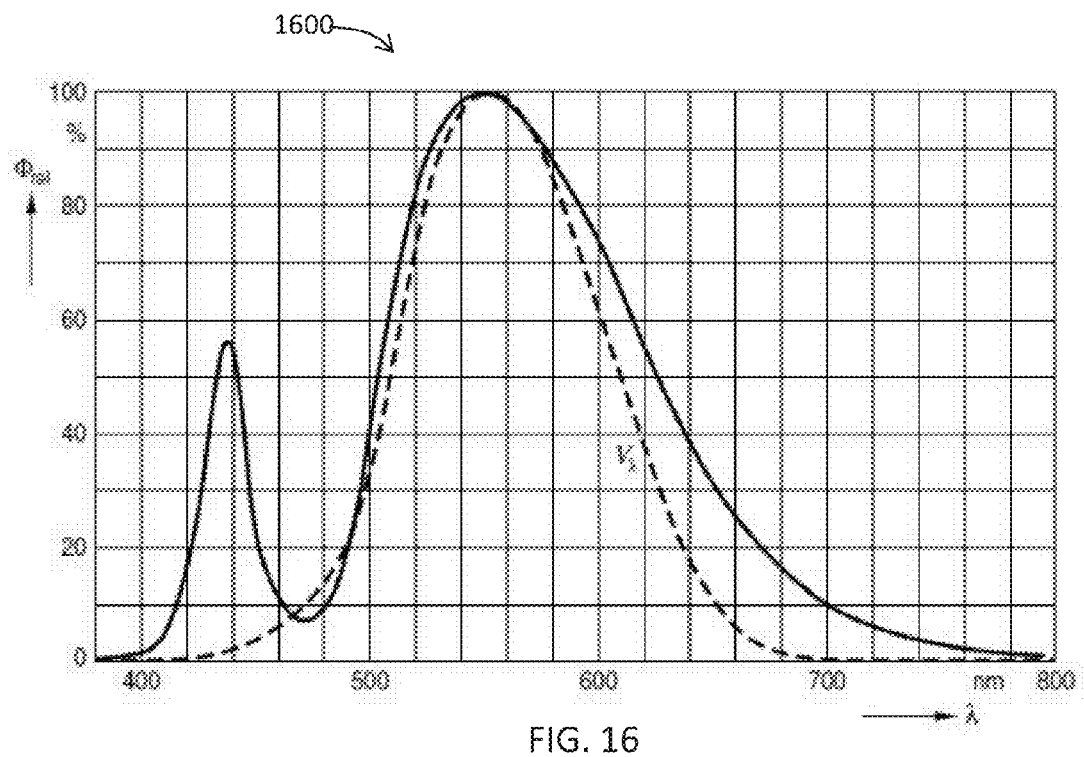
FIG. 16 is a graph of the light emitting spectrum of a Mint light emitting diode (LED).

Referring additionally to FIGS. 13-16, the spectra of the LEDs that may be employed in the LED die layouts 1100, 1200 in the above example embodiments of the invention are shown in greater detail. All example LEDs were obtained from OSRAM Opto-Semiconductors. The Hyper-Red LED is an Oslon package (LH-CPDP) that exhibits the spectrum 1300 shown in FIG. 13. The amber LED is (KXKZ-23-Z) exhibits the spectrum 1400 as shown in FIG. 14. The bluish-white LED spectrum 1500 is shown in FIG. 15. The LED mint spectrum 1600 is shown in FIG. 16.

In the embodiments described above, all LEDs 1012 are assumed to be driven with substantially the same current. However, a variable currents scheme may also be used, and other arrangements and types of LEDs 1012 may be used to generate emission spectra similar to those shown above and are within the scope of the invention. Furthermore, for a given spectrum, other board configurations, LED package layouts, and LED choices may be employed to achieve the desired properties of an LED lamp.

Mitigating Saturation and Heating

Figure 17:
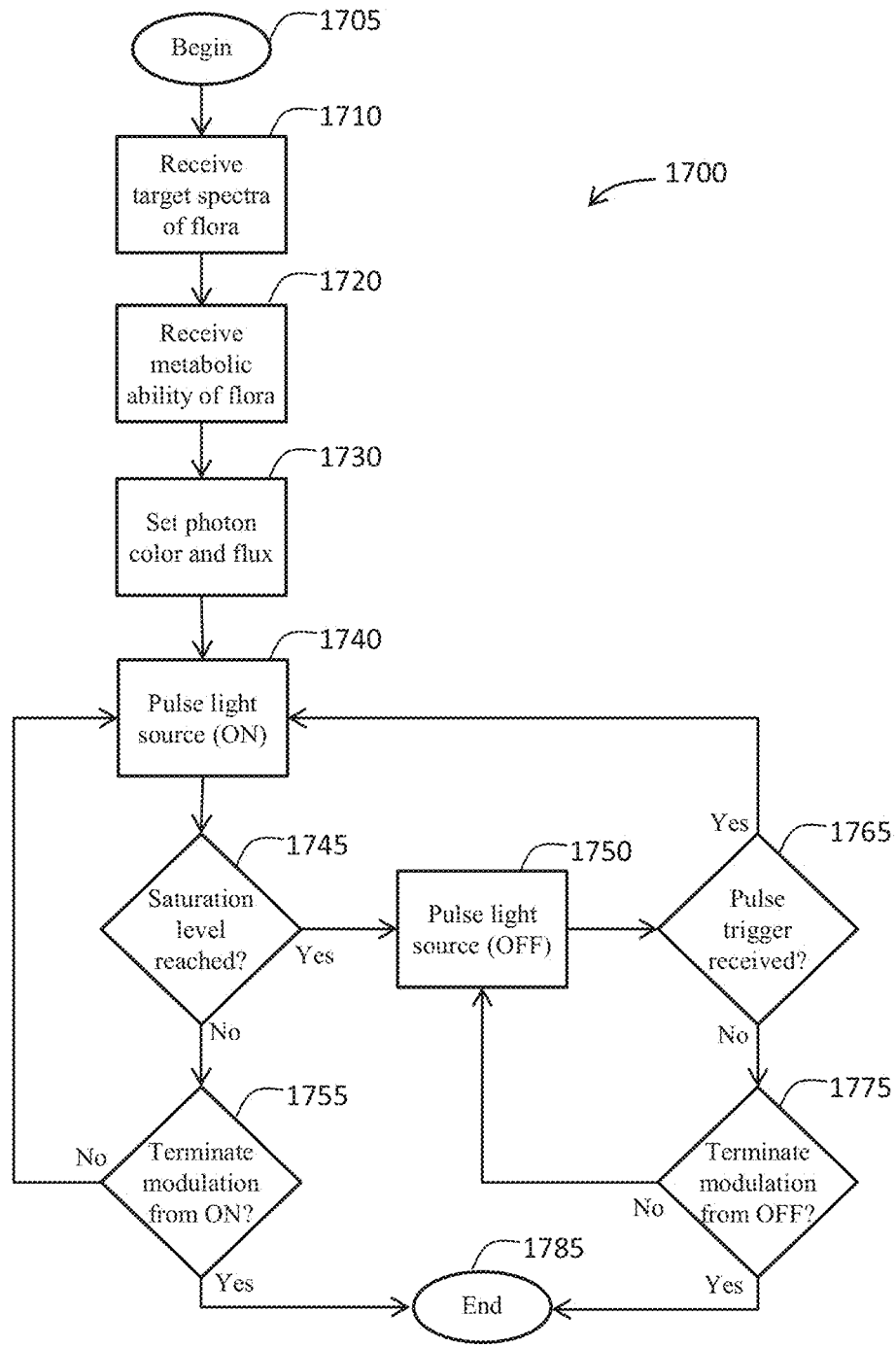
FIG. 17 is a flowchart illustrating a method aspect of an embodiment of the present invention for modulating the emissions of an illumination and grow light system according to an embodiment of the present invention.
Figure 18A:
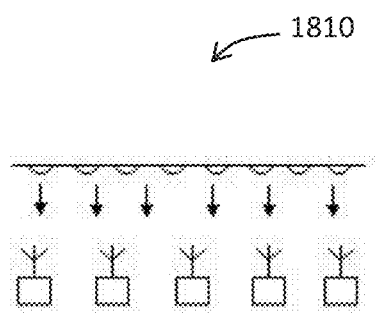
FIGS. 18A, 18B, 18C and 18D are schematic diagrams illustrating alternative embodiments of the illumination of the horticultural growths according to an embodiment of the invention.
Figure 18B:
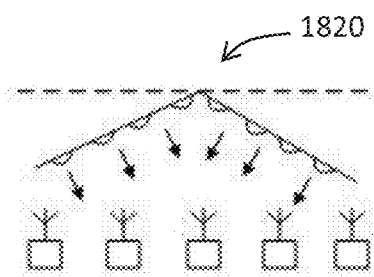
Figure 18C:
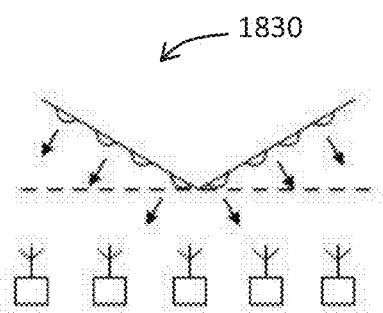
Figure 18D:
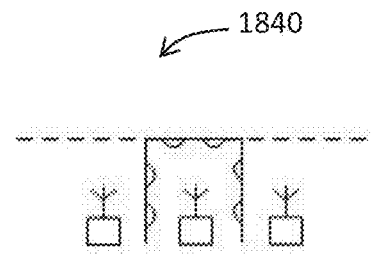

Referring now to flowchart 1700 of FIG. 17, the operation of a method of pulsing the emissions of an illumination and grow light system to mitigate saturation and heating of a plant will be discussed. The following illustrative embodiment is included to provide clarity for one operational method that may be included within the scope of the present invention. A person of skill in the art will appreciate additional operations that may be included in pulsing an illumination and grow light system of the present invention, which are intended to be included herein and without limitation.

From, the start, the operation may begin at Block 1710, where a controller may receive as input the photosynthetic response action spectrum 300 for a given type of flora. At Block 1720, the controller may also receive as input limitations as to the metabolic abilities of the flora. For example, and without limitation, an individual plant, leaf, or cell can only utilize and convert photonic energy to useable plant energy (i.e., photon energy absorbed and used in the electron transport mechanism) at a certain photon flux above a saturation point. Due to this phenomenon of saturation, the plant cells/tissue will be unable to convert the additional photons into useable energy, and these additional photons will instead be absorbed and converted into heat, which may be undesirable if in excess.

Based on the input received regarding the subject flora, the controller may be employed to set the desired light emission characteristics, such as photon color and flux (Block 1730). The controller may then direct some number of light sources to turn on at Block 1730. The controller may monitor signals from some number of sensors, and/or from a user interface, to determine if absorption of the emitted light by the subject plant has reached the plant's saturation level (Block 1745). Until that saturation level is detected at Block 1745, or a signal to terminate the emission of light (Block 1755), the controller may permit the current mode of emission ("on" state) to continue (Block 1740). If, at Block 1745, the controller receives a signal that the saturation level of the subject plant has been reached, the controller may then direct some number of light sources to turn off at Block 1750.

While no light is being emitted from the light sources, the controller may monitor signals from some number of sensors, and/or from a user interface, to determine if absorption of light energy by the subject plant has dropped sufficiently below the plant's saturation level to trigger the application of more tuned light (Block 1765). Until the plant's readiness to absorb more light energy is detected at Block 1765, or a signal to terminate the emission of light is received (Block 1775), the controller may permit the current mode of emission ("off" state) to continue (Block 1775). If, at Block 1765, the controller receives a signal that the subject plant is ready to absorb more light energy, the controller may then direct some number of light sources to turn on at Block 1740.

In the manner described above, the operation will continue to pulse the emission of light between "on" and "off" states in a way that may optimize the absorption of light energy by a subject plant while avoiding harmful heating of the plant and conserving energy in the production of emitted light. If the controller receives a signal to terminate pulsing (Blocks 1755 or 1775), the method may end at Block 1785.

Various approaches to implementing the method described above are contemplated for carrying out the present invention. In one embodiment, a pulse width modulation (PWM) protocol may be employed to address potential overheating issues, and to optimize efficiency. By using PWM per individual color or colors of LEDs, the photon flux may be tuned and optimized to prevent oversaturation and overheating. In one embodiment, the system may be programmed to generate spectra for a specific type of flora. Each type of plant may have different saturation levels. Additionally, plant saturation levels may vary depending on 1) stage of growth, 2) nutrient availability, 3) ambient light levels (time of day), and other factors. The illumination and grow light system of the present invention may be programmed to optimize photon color and flux based on the unique characteristics and limitations of the subject plant.

By pulsing the LEDs in a synchronous or quasi-synchronous manner in relation to a plant's ability to absorb photon energy and use it for photosynthesis (or other plant metabolic activity), not only may heat be minimized but also energy efficiency can greatly be increased. More specifically, pulsing may ensure that photons are not impinging on plant tissue (or impinging less) when the plant cannot use the photon energy metabolically. Applied in the method described above, PWM may achieve not only optimum growth characteristics but also may result in a dramatic reduction in energy use and cost by the users of systems and methods disclosed herein. By coordinating pulses such that the light is off when the leaf or photosynthetic system is saturated, energy may be conserved, efficiency increased, and heating minimized. Other means of pulsing the light or otherwise delivering light or specific wavelengths of light and intensities at specific time intervals to achieve a specific or desired level of photon dosing or PAR dosing may also be employed as will be evident to those skilled in the art.

In another embodiment of implementing the method described above, monitoring the saturation level of a subject plant may be accomplished using sensors. Plants may have fluorescent properties, and the sensing or measuring of the fluorescent output can be used to coordinate the spectrum, intensity, and timing of the grow light. For example, and without limitation, a wide variety of species of algae is known to fluoresce upon exposure to visible light. In some cases, the fluorescence spectrum emitted may indicate the status of the plant, such as metabolic activity, health, saturation of light, and time from dark adaptation. By sensing or measuring the fluorescence or attributes thereof (e.g., with a fluorometer, spectrometer, infrared sensor, or other device), information about the state of the flora may be obtained. That information can be used (e.g., programmed into a controller) to drive the emissions of a grow light such that its output is optimized for the given condition of the flora and environment. For example, and without limitation, it is known that in some cases light saturation of the photosynthetic system (PS) may cause a change in the fluorescence of the organism. Thus, in this example, saturation levels of light may be identified or predicted by measuring the fluorescence spectrum in real-time. This information may then be used to drive the grow lamp (or elements thereof), for example, using PWM or PAM/PIM such that over-saturation may be prevented, energy may be conserved, and plant growth may be optimized.

In yet another embodiment of implementing the method described above, pulsing the light source on or off may be accomplished by manually or automatically adjusting individual light sources and/or the entire lighting unit in order to deliver light and/or light intensity within a given solid angle or directed to a certain area of plants. Example embodiments are illustrated in FIGS. 18a-d, the various arrangements of which may allow for controlling the intensity of light and spectrum falling of a given set or plants or plant species. Alternatively or additionally, the adjustment of the combined light emitted from a lighting unit may be managed by a controller which is connected to a sensor (e.g., ambient light sensor, plant growth sensor, $CO_2$ sensor, timer, etc.). Although the examples shown are for a linear fixture, other shapes or combination of shapes that are either fixed or adjustable (via hinges, connectors, etc.) may be used to obtain the desired distribution and are within the scope of the invention.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. As described, some or all of the steps of each method may be implemented in the form of computer executable software instructions. Furthermore, the instructions may be located on a server that is accessible to many different clients, may be located on a single computer that is available to a user, or may be located at different locations. Therefore, the claims should be interpreted in a broad manner, consistent with the present disclosure. While various embodiments have been described for purposes of this disclosure, numerous changes and modifications will be apparent to those of ordinary skill in the art. Such changes and modifications are encompassed within the spirit of this invention as defined by the claims.

Embodiments of the present invention are described herein in the context of a system of computers, servers, and software. Those of ordinary skill in the art will realize that the following embodiments of the present invention are only illustrative and are not intended to be limiting in any way. Other embodiments of the present invention will readily suggest themselves to such skilled persons having the benefit of this disclosure.

Figure 19:
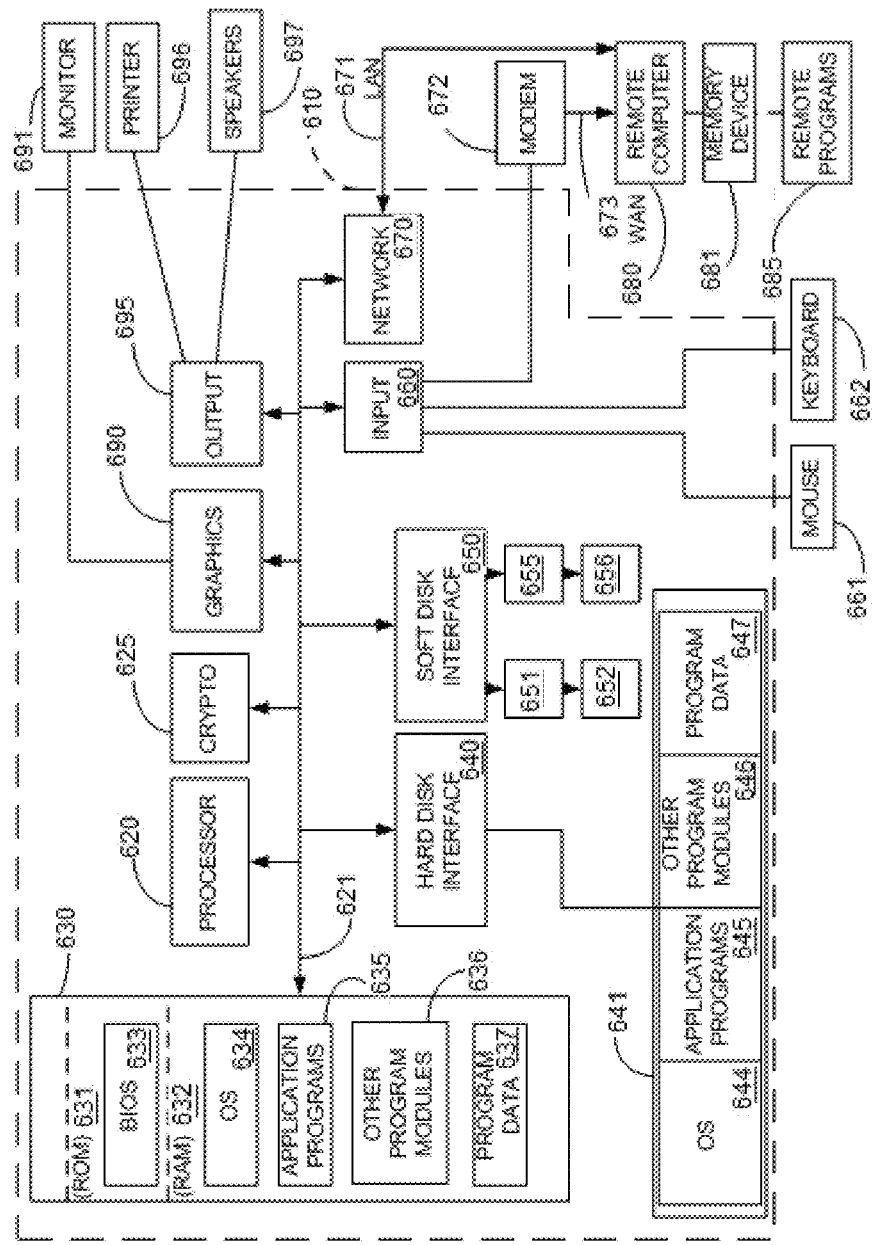
FIG. 19 is a block diagram representation of a machine in the example form of a computer system according to an embodiment of the present invention.

A skilled artisan will note that one or more of the aspects of the present invention may be performed on a computing device, including mobile devices. The skilled artisan will also note that a computing device may be understood to be any device having a processor, memory unit, input, and output. This may include, but is not intended to be limited to, cellular phones, smart phones, tablet personal computers (PCs), laptop computers, desktop computers, personal digital assistants (PDAs), etc. FIG. 19 illustrates a model computing device in the form of a computer 610, which is capable of performing one or more computer-implemented steps in practicing the method aspects of the present invention. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (USA) bus, Micro Channel Architecture (MCA) bus, Enhanced ISA (EISA) bus, Video Electronics Standards Association (VESA) local bus, and Peripheral Component Interconnect (PCI).

The computer 610 may also include a cryptographic unit 625. Briefly, the cryptographic unit 625 has a calculation function that may be used to verify digital signatures, calculate hashes, digitally sign hash values, and encrypt or decrypt data. The cryptographic unit 625 may also have a protected memory for storing keys and other secret data. In other embodiments, the functions of the cryptographic unit may be instantiated in software and run via the operating system.

A computer 610 typically includes a variety of computer readable media. Computer readable media can be any available media that can be accessed by a computer 610 and includes both volatile and nonvolatile media, removable and non-removable media. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 19 illustrates an operating system (OS) 634, application programs 635, other program modules 636, and program data 637.

The computer 610 may also include other removable/non-removable, volatile/nonvolatile computer storage media. By way of example only, FIG. 19 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives, and their associated computer storage media discussed above and illustrated in FIG. 19, provide storage of computer readable instructions, data structures, program modules and other data for the computer 610. In FIG. 19, for example, hard disk drive 641 is illustrated as storing an OS 644, application programs 645, other program modules 646, and program data 647. Note that these components can either be the same as or different from OS 634, application programs 635, other program modules 636, and program data 637. The OS 644, application programs 645, other program modules 646, and program data 647 are given different numbers here to illustrate that, at a minimum, they may be different copies. A user may enter commands and information into the computer 610 through input devices such as a keyboard 662 and cursor control device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a graphics controller 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 19. The logical connections depicted in FIG. 19 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 19 illustrates remote application programs 685 as residing on memory device 681.

The communications connections 670 and 672 allow the device to communicate with other devices. The communications connections 670 and 672 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

In accordance with embodiments of the present invention, the components, process steps, and/or data structures may be implemented using various types of operating systems, computing platforms, computer programs, and/or general purpose machines. In addition, after having the benefit of this disclosure, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

The computer program, according to an embodiment of the present invention, is a computerized system that requires the performance of one or more steps to be performed on or in association with a computerized device, such as, but not limited to, a server, a computer (i.e., desktop computer, laptop computer, netbook, or any machine having a processor), a dumb terminal that provides an interface with a computer or server, a personal digital assistant, mobile communications device, such as an cell phone, smart phone, or other similar device that provides computer or quasi-computer functionality, a mobile reader, such as an electronic document viewer, which provides reader functionality that may be enabled, through either internal components or connecting to an external computer, server, or global communications network (such as the Internet), to take direction from or engage in processes which are then delivered to the mobile reader. It should be readily apparent to those of skill in the art, after reviewing the materials disclosed herein, that other types of devices, individually or in conjunction with an overarching architecture, associated with an internal or external system, may be utilized to provide the "computerized" environment necessary for the at least one process step to be carried out in a machine/system/digital environment. It should be noted that the method aspects of the present invention are preferably computer-implemented methods and, more particularly, at least one step is preferably carried out using a computerized device.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A lighting system with selectable emission characteristics comprising:
 a controller; and
 a plurality of light sources operatively coupled to the controller;
 wherein each of the plurality of light sources is individually operable to emit a combined light comprising a first light having a wavelength within the range of about 650 nanometers to about 700 nanometers, a second light having a wavelength within the range of about 500 nanometers to about 570 nanometers, and a third light having a wavelength within the range of about 430 nanometers to about 470 nanometers;
 wherein the controller controls emission characteristics of the plurality of light sources to alter the combined light;
 wherein the second light is characterized by a relative human photopic response of greater than 0.0 and less than 0.4 throughout the range from about 500 nanometers to about 570 nanometers;
 wherein the combined light has a color temperature greater than about 3000 Kelvin, a Color Rendering Index of greater than about 65, and a photosynthetic efficiency of greater than about 1 micromole Yield Photon Flux per Watt.

2. A lighting system according to claim 1 wherein the second light is characterized by a relative action of greater than 0.0 and less than 0.2.

3. A lighting system according to claim 1 wherein the combined light has a color temperature of greater than about 3800 Kelvin and a Color Rendering Index of greater than about 70.

4. A lighting system according to claim 1 wherein the controller is configured to modulate the emissions of the plurality of light sources in a pulsed fashion.

5. A lighting system according to claim 1 wherein the controller is configured to modulate the emissions of the plurality of light sources using at least one of pulse-width modulation, pulse-interval modulation, and pulse-amplitude modulation.

6. A lighting system according to claim 1 wherein the controller is configured to modulate the emissions of the plurality of light sources in a pulsed pattern that minimizes light saturation in flora upon which the combined light emitted by the plurality of light sources is incident.

7. A lighting system according to claim 1 wherein the plurality of light sources includes a first light source configured to emit light in a first wavelength range and a second light source configured to emit light in a second wavelength range; wherein the controller is configured to modulate the emissions of the first light source in a first pulsed pattern; and wherein the controller is configured to modulate the emissions of the second light source in a second pulsed pattern.

8. A lighting system according to claim 1 further comprising a sensor having a field of view; wherein the sensor is operatively coupled to the controller and is configured to measure light saturation in flora within the field of view of the sensor; wherein the controller receives an indication of light saturation in flora from the sensor and is configured to control emission characteristics for the plurality of light sources responsive to the indication of light saturation in flora from the sensor.

9. A lighting system according to claim 8 wherein the sensor is a fluorometer, and wherein the indication of light saturation comprises a measurement of a fluorescence being emitted from the flora.

10. A lighting system according to claim 8 wherein the sensor is a spectrometer, and wherein the indication of light saturation comprises a measurement of a wavelength of light being reflected from the flora.

11. A lighting system according to claim 10 wherein the indication of light saturation includes the measurement of the wavelength of light being emitted from the flora that is within a range of one of about 650 nanometers to about 700 nanometers, about 500 nanometers to about 570 nanometers, and about 430 nanometers to about 470 nanometers.

12. A lighting system according to claim 8 wherein the sensor is an infrared sensor, and wherein the indication of light saturation in flora comprises a measurement of an infrared radiation being emitted from the flora.

13. A lighting system according to claim 8 further comprising a housing; wherein the housing is operably coupled to the controller and configured to be adjustable to allow for at least one of directional control and intensity control of the combined light emitted by the plurality of light sources; wherein the controller is configured to receive an indication of light saturation in flora from the sensor and to adjust the housing to distribute the combined light in a direction and at an intensity that optimizes light saturation in flora upon which the combined light emitted by the plurality of light sources is incident.

14. A lighting system according to claim 1 further comprising a housing, wherein the housing is configured to be adjustable to allow for at least one of directional control and intensity control of the combined light emitted by the plurality of light sources.

15. A lighting system according to claim 1 wherein the lighting system emits a combined light that has a photosynthetic efficiency of greater than about 1.2 micromole Yield Photon Flux per Watt.

16. A lighting system according to claim 1 wherein at least one of the plurality of light sources is a light-emitting diode.

17. A lighting system according to claim 16 further comprising one or more optics, wherein each of the one or more optics is paired with and disposed adjacent to the light-emitting diode such that light emitted from the light-emitting diode is incident upon the each of the one or more optics.

18. A lighting system according to claim 17 wherein each of the one or more optics is paired with at least two light-emitting diodes.

19. A lighting system according to claim 17 wherein each of the one or more optics further comprises at least one of a diffusive coating, a diffusive plastic, diffusive particles, and a color filter.

20. A lighting system according to claim 1 wherein the plurality of light sources includes a hyper-red light-emitting diode, an amber light-emitting diode, and a blue-white light-emitting diode.

21. A lighting system according to claim 1 wherein the plurality of light sources has a ratio of hyper-red light-emitting diodes to amber light-emitting diodes to blue-white light-emitting diodes of about 6:1:5.

22. A lighting system according to claim 1 wherein the plurality of light sources includes hyper-red light-emitting diodes and mint light-emitting diodes.

23. A lighting system according to claim 1 wherein the plurality of light sources has a ratio of hyper-red light-emitting diodes to mint light-emitting diodes of about 2:1.

24. A lighting system according to claim 1 further comprising at least one power supply operably coupled to the controller, wherein the controller is configured to regulate current from the at least one power supply to control emission characteristics for the plurality of light sources to emit the combined light.

25. A lighting system according to claim 1 wherein at least one of the plurality of light sources is a laser.

26. A lighting system with selectable emission characteristics comprising:
a plurality of light-emitting lamps, each lamp comprising a plurality of light sources, configured to emit a first light having a wavelength within the range of about 650 nanometers to about 700 nanometers, a second light having a wavelength within the range of about 500 nanometers to about 570 nanometers and having a relative human photopic response of greater than 0.0 and less than 0.4 throughout the range from about 500 nanometers to about 570 nanometers, and a third light having a wavelength within the range of about 430 nanometers to about 470 nanometers; and
a controller operable to control the output of light from the plurality of light-emitting lamps;
wherein at least one of the plurality of light-emitting lamps emits light having a color temperature greater than about 3000 k and a photosynthetic efficiency of greater than about 1 micromole Yield Photon Flux per Watt.

27. A lighting system according to claim 26 wherein the second light has a relative action of greater than 0.0 and less than 0.2.

28. A lighting system according to claim 26 further comprising a sensor configured to electronically communicate with the controller; wherein the sensor transmits data to the controller; and wherein the controller operates the plurality of light-emitting lamps responsive to the data transmitted from the sensor.

29. A lighting system according to claim 28 wherein the sensor is selected from the group consisting of a timer, a fluorometer, and a spectrometer.

30. A lighting system according to claim 26 wherein at least one of a position and an orientation of the plurality of light-emitting lamps is configured for at least one of manual adjustment and automatic adjustment.

31. A lighting system comprising:
a body member on which a plurality of light-emitting diodes are mounted; and
a controller disposed on or near the body member and configured to electrically couple to a power source and to the plurality of light emitting diodes;
wherein at least two of the plurality of the light-emitting diodes are electrically activated by the controller;
wherein the lighting system emits a combined light comprising a first light having a wavelength within the range of about 650 nanometers to about 700 nanometers, a second light having a wavelength within the range of about 500 nanometers to about 570 nanometers and having a relative human photopic response of greater than 0.0 and less than 0.4 throughout the range from about 500 nanometers to about 570 nanometers, and a third light having a wavelength within the range of about 430 nanometers to about 470 nanometers;

wherein the combined light has a photosynthetic efficiency of greater than about 1 micromole yield photon flux per watt and a Color Rendering Index of greater than about 65.

32. A lighting system according to claim 31 wherein the second light has a relative action of greater than 0.0 and less than 0.2.

33. A lighting system according to claim 31 wherein the plurality of light-emitting diodes includes a red light-emitting diode, an amber light-emitting diode, and a blue-white light-emitting diode.

34. A lighting system according to claim 31 wherein the plurality of light-emitting diodes has a ratio of red light-emitting diodes to amber light-emitting diodes to blue-white light-emitting diodes of about 17:4:15.

35. A lighting system according to claim 31 wherein the plurality of light-emitting diodes includes a red light-emitting diode and a mint light-emitting diode.

36. A lighting system according to claim 31 wherein the plurality of light-emitting diodes has a ratio of red light-emitting diodes to mint light-emitting diodes of about 2:1.

37. A lighting system according to claim 31 further comprising a user interface configured to electronically communicate with the controller; and wherein the controller operates the plurality of light-emitting lamps responsive to the instructions transmitted from the user interface.

38. A method of illuminating flora using a lighting system comprising a controller and a plurality of light sources operatively coupled to the controller, wherein each of the plurality of light sources is individually operable to emit a combined light comprising a first light having a wavelength within the range of about 650 nanometers to about 700 nanometers, a second light having a wavelength within the range of about 500 nanometers to about 570 nanometers, and a third light having a wavelength within the range of about 430 nanometers to about 470 nanometers, wherein the controller controls emission characteristics of the plurality of light sources to alter the combined light, wherein the second light is characterized by a relative human photopic response of greater than 0.0 and less than 0.4 throughout the range from about 500 nanometers to about 570 nanometers, and wherein the combined light has a color temperature greater than about 2700 Kelvin, a Color Rendering Index of greater than about 60, and a photosynthetic efficiency of greater than about 1 micromole Yield Photon Flux per Watt; the method comprising directing the combined light on flora.

39. The method according to claim 38 wherein directing the combined light on flora further comprises modulating the combined light in a pulsed fashion.

40. The method according to claim 39 wherein modulating the combined light further comprises employing at least one of pulsewidth modulation, pulse-interval modulation, and pulse-amplitude modulation.

41. The method according to claim 38 wherein directing the combined light on flora further comprises altering the combined light based on an indication of light saturation in flora.

42. The method according to of claim 41 wherein altering the combined light further comprises measuring light saturation in flora within the field of view of a sensor.

43. The method according to of claim 38 wherein directing the combined light on flora further comprises changing an illuminated area on flora.

44. The method according to of claim 43 wherein changing the illuminated area on flora further comprises adjusting a housing that is configured to allow for at least one of directional control and intensity control of the combined light.

45. The method according to of claim 43 wherein changing the illuminated area on flora further comprises adjusting an optic that is configured to allow for at least one of directional control and intensity control of the combined light.

* * * * *